United States Patent [19]

Tanaka et al.

[11] Patent Number: 4,868,409
[45] Date of Patent: Sep. 19, 1989

[54] VEHICULAR ANTI-THEFT SYSTEM

[75] Inventors: Akira Tanaka; Norimitsu Kurihara, both of Wako, Japan

[73] Assignee: Honda Giken Kogyo K.K., Tokyo, Japan

[21] Appl. No.: 277,400

[22] Filed: Nov. 28, 1988

Related U.S. Application Data

[63] Continuation of Ser. No. 121,321, Nov. 16, 1987, abandoned.

[30] Foreign Application Priority Data

Nov. 14, 1988 [JP] Japan ................................ 61-271439

[51] Int. Cl.$^4$ .......................................... H01H 27/00
[52] U.S. Cl. .................................... 307/10.5; 361/171; 361/172; 70/271; 70/278; 250/227
[58] Field of Search ................ 307/10 R, 10 AT; 361/168.1, 169.1, 170, 171, 172, 173, 174, 175, 176, 177; 340/52 R, 63, 64, 825.31; 70/271, 277, 278, 284, 264, 237, 256, 257, 239; 250/227, 555, 225, 560, 578; 180/281, 287; 235/462, 382

[56] References Cited

U.S. PATENT DOCUMENTS

| | | | |
|---|---|---|---|
| 4,196,347 | 4/1980 | Hadley | 70/271 X |
| 4,250,533 | 2/1981 | Nelson | 70/278 X |
| 4,392,134 | 7/1983 | Lutz | 340/825.31 |
| 4,438,426 | 3/1984 | Adkins | 340/64 |
| 4,449,126 | 5/1984 | Pekker | 340/825.32 |
| 4,509,093 | 4/1985 | Stellberger | 361/172 |
| 4,594,505 | 6/1986 | Sugimoto | 307/10 AT X |
| 4,639,713 | 1/1987 | Kitagawa et al. | 250/227 X |
| 4,652,860 | 3/1987 | Weishaupt et al. | 340/63 X |
| 4,663,952 | 5/1987 | Gelhard | 70/278 |
| 4,723,121 | 2/1988 | Boom et al. | 361/171 X |

Primary Examiner—William M. Shoop, Jr.
Assistant Examiner—Paul Ip
Attorney, Agent, or Firm—Skjerven, Morrill, MacPherson, Franklin & Friel

[57] ABSTRACT

A vehicular anti-theft system which combines a mechanical key and an electronic key involving a code light signal. A light emitting element is provided in a casing attached to a base end of the shank of the mechanical key while a light receiving element is provided adjacent to an open end of the key hole so that the conventional action of fitting the key shank into the key hole causes the transmission of a code light signal between these elements. Advantageously, the light emitting element can be additionally equipped with the function of locking and unlocking a vehicle door so that the user can obtain the benefits of both a remote control entry system and a highly effective anti-theft engine start system.

29 Claims, 3 Drawing Sheets

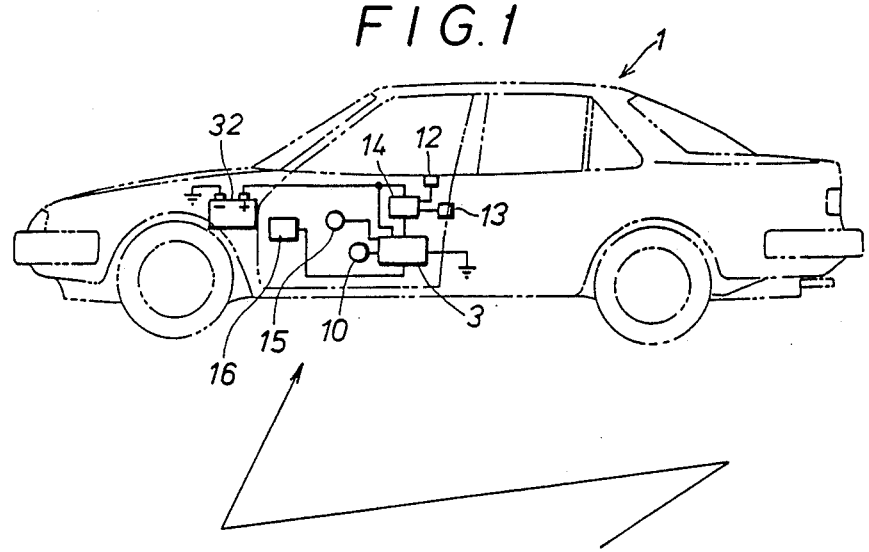
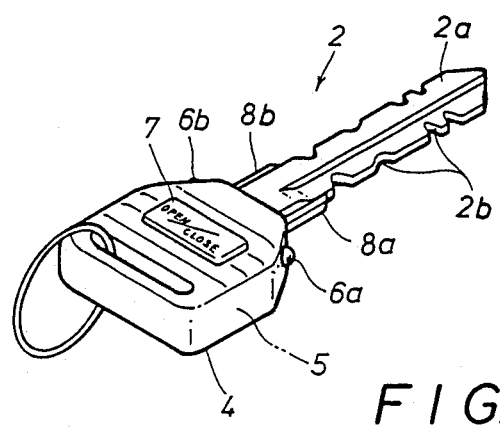
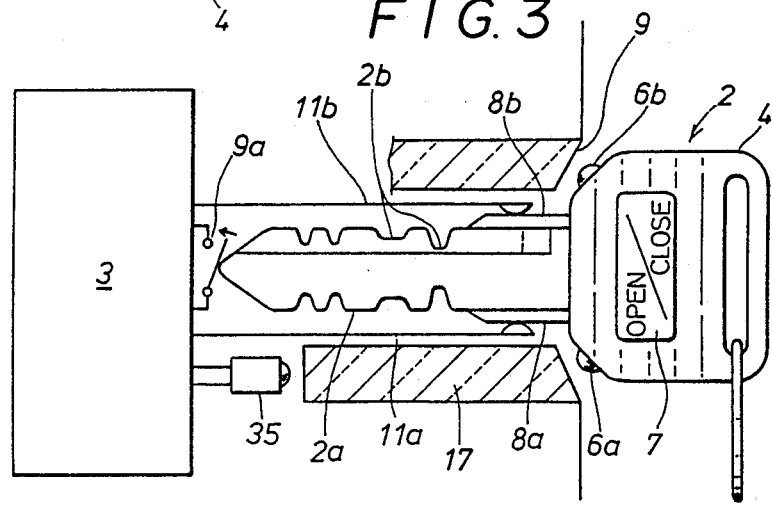

F I G. 4
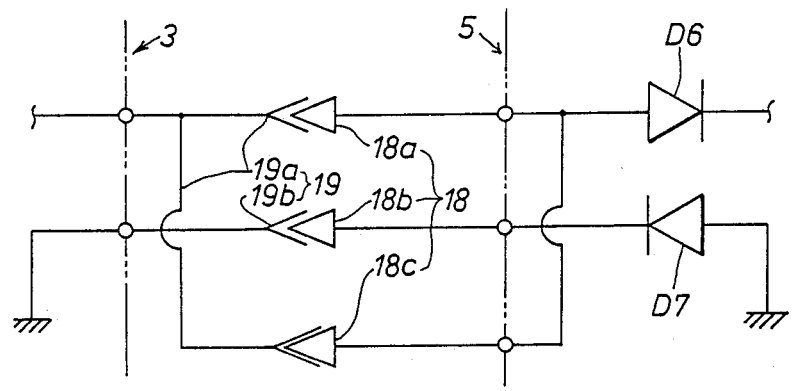
F I G. 5
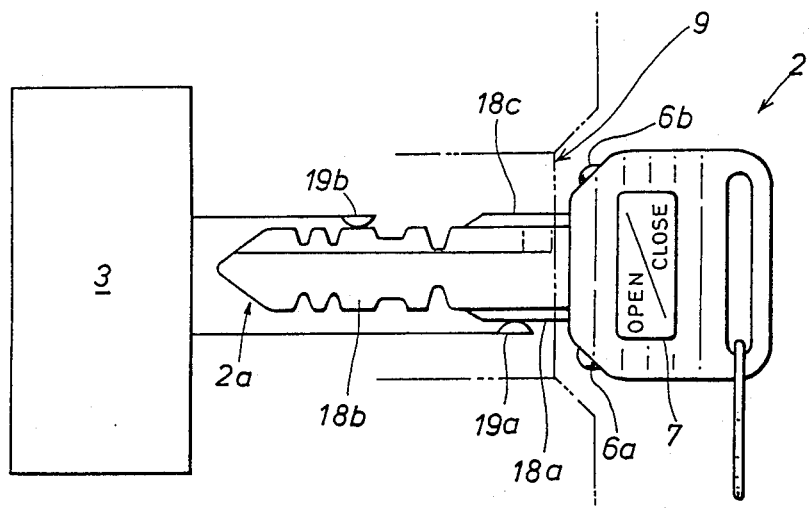

VEHICULAR ANTI-THEFT SYSTEM

This application is a continuation of application Ser. No. 121,321, filed 11/16/87 now abandoned.

BACKGROUND OF THE INVENTION

The present invention relates to an electronic vehicular anti-theft system which is as simple as a conventional ignition key to use but can effectively protect vehicles from theft.

Various anti-theft systems have been proposed and many of them combine a mechanical key and an electric or electronic key. This is advantageous because the users can use them much in the same way as conventional keys and can yet get the benefits of electronic keys which can not be easily bypassed or duplicated by unauthorized persons. For instance, U.S. Pat. No. 3,515,891 teaches a key incorporating a crystal element and U.S. Pat. No. 4,148,372 discloses a key incorporating a resistor pellet. This crystal element or the resistor pellet is connected to a circuit mounted on the vehicle when the key is fitted into the key hole and is determined to be a correct one or not by this circuit. However, these keys must be incorporated with various fixed elements having unique characteristics which cannot be changed easily. Therefore, the production of such keys necessarily tends to be complicated and authorized duplication of the keys is cumbersome.

U.S. Pat. No. 4,222,034 teaches a combination of a mechanical key and an ultrasonic transmitter and Japanese patent laid-open publication No. 57-90237 discloses a combination of a key and a radio transmitter. These electronic keys may be provided with a large number of code combinations which could be "written" or "burnt" into the keys but the receivers of ultrasonic sound and radio waves are relatively complicated and could be affected by external interferences.

BRIEF SUMMARY OF THE PRESENT INVENTION

In view of such shortcomings of the prior art, a primary object of the present invention is to provide a vehicular anti-theft system which is simple to use and is yet highly effective in preventing vehicle theft.

Another object of the present invention is to provide a vehicular anti-theft system which can be provided with a large number of code combinations and is yet easy to produce.

Yet another object of the present invention is to provide a vehicular anti-theft system which cannot be easily bypassed or duplicated by an unauthorized person but can be easily produced and duplicated by an authorized person.

Yet another object of the present invention is to provide a vehicular anti-theft system which is free from external interferences.

These and other objects of the present invention can be accomplished by providing a vehicular anti-theft system, comprising: a key device having a shank and a casing which is connected to a base end of the shank and is adapted to be held between fingers of a user, the casing of the key device being provided with a light emitting element which is adapted to emit a code light signal; a key hole provided on a vehicle adapted to receive the shank of the key device therein from an open end of the key hole; a light receiving element provided adjacent to the open end of the key hole so as to receive the code light signal from the light emitting element when the key device is brought close to the key hole or when the shank of the key device is fitted into the key hole; and control means connected to the light receiving element for receiving a code signal from the light emitting element; the control means being provided with light code matching means which enables a device mounted on the vehicle when the code signal from the light receiving element matches with an internal code. Optionally, a manual switch may be provided to the key device to activate the light emitting element Thus, the user can use the anti-theft system much in the same way as a conventional mechanical key and obtain the benefits of an electronic key. The code matching means may be activated when the detecting means has detected either the presence of the shank of the key device in the key hole or the rotation of the key shank in the key hole for an improved security According to a certain aspect of the present invention, the shank of the key device and the key hole are provided with electric contacts, respectively, which cooperate one another for supplying electric power from a power source of the vehicle to the light emitting element of the key device, preferably by way of a rechargeable battery, when the key shank is fitted into the key hole. Thus, the light emitting element may be activated and, optionally, the battery of the key device may be automatically charged as one fits the key shank, for instance, into an ignition key switch. By provision of such electric contacts, the size of the battery which more or less determines the size of the casing can be reduced without creating the need for frequent replacement of the battery or even the battery may be totally omitted.

Further, if the electric power from the power source of the vehicle is supplied to the light emitting element only when it is detected that the key shank of the key device is fitted into the key hole or turned therein, the possibility of inadvertent short-circuiting of the power source of the vehicle can be prevented and the security of the anti-theft system can be improved.

According to another aspect of the present invention, the shank of the key device consists of a generally planar member having a pair of narrow side faces and a pair of broad side faces, at least a pair of the electric contacts being arranged on these side faces, the electric contacts of the key device being connected to the light emitting element by way of a polarity rectifying means; and the key hole is so shaped as to be generally complementary to the shank and is provided with two sets of the electric contacts at positions around the open end of the key hole which oppose one another by a 180 degree angle in such a manner that the shank of the key device may be fitted into the key hole at two different orientations.

Thus, since the key shank may be fitted into the key hole at two different orientations in the same way as conventional mechanical keys and electric current of correct polarity is always supplied to the key device, the convenience of the key device will be enhanced. In this case and other cases, the number of light emitting elements and light receiving elements can be minimized when a light conducting ring is provided around the open end of the key hole for conducting the code light signal from the light emitting element to the light receiving element; when a pair of light emitting elements are provided in the housing of the key device adjacent to the base end of the shank and angularly displaced by 180 degrees about a longitudinal axial line of the shank of the key device; or when a pair of light receiving elements are provided adjacent to the open end of the key hole at positions which are angularly displaced by 180 degrees about a longitudinal axial line of the key hole According to yet another aspect of the present invention, the shank of the key device and the key hole are provided with mechanical code matching means which cooperate one another and the device mounted on the vehicle is enabled when code matching of both the light code matching means and the mechanical code matching means is detected. Since bypassing or duplicating both the mechanical code matching means and the light code matching means is extremely difficult, an extremely high level of reliability can be obtained.

According to yet another aspect of the present invention, the device to be enabled comprises an engine ignition system and a vehicle door lock device, and code matching of both the mechanical code matching means and the light code matching means is required to enable the engine ignition system but code matching of either the mechanical code matching means or the light code matching means is required to enable the door lock device, the light emitting element being provided with manual switch means for activating the same at least for enabling the door lock device. According to this embodiment, the anti-theft system can be advantageously combined with a remote control entry system which is conventional by itself and both the convenience and the economy can be achieved at the same time.

BRIEF DESCRIPTION OF THE DRAWINGS

Now the present invention is described in the following with reference to the appended drawings, in which:

FIG. 1 illustrates a vehicular anti-theft system according to the present invention;

FIG. 3 shows an embodiment of the key hole structure according to the present invention;

FIG. 4 shows an alternate embodiment of the contact structure for supplying electric power to the key device; and FIG. 5 shows another embodiment of the key hole structure which is adapted to the contact structure shown in FIG. 4.

DETAILED DESCRIPTION OF THE PREFERRED EMBODIMENTS

Figure 2:
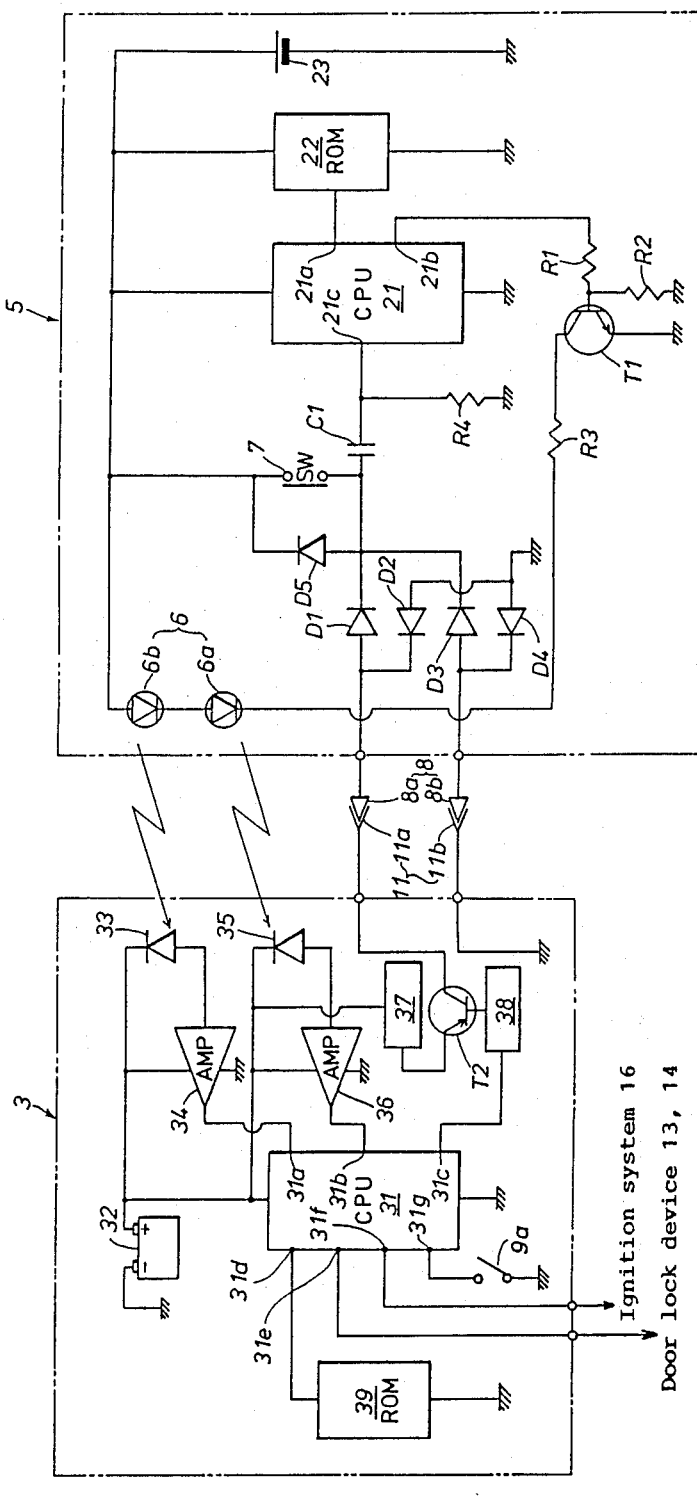
FIG. 2 is a circuit diagram of an embodiment of the vehicular anti-theft system according to the present invention.

FIG. 1 generally illustrates a vehicle 1 and a key device 2. The key device 2 comprises a shank 2a which is provided with notches 2b in the same way as conventional key shanks and a flat, box-shaped casing 4 which is attached to a base end of the shank 2a and is adapted to be held between fingers when the key shank 2a is to be fitted into a key hole which is not shown in FIG. 1. The casing 4 is internally equipped with a transmitter 5 which emits a code light signal from a pair of infrared light emitting diodes 6a and 6b provided on either corner portion of the casing 4 adjacent to the base end of the key shank 2a. This transmitter 5 can be activated when a push button 7 provided on a broad face of the casing 7 is pressed. The key shank 2a consists of a generally planar member and its base end is provided with a pair of narrow sides and a pair of broad sides. The narrow sides at the base end of the key shank 2a are each provided with an electric contact 8a or 8b which is insulated from the key shank 2a.

This key device 2 externally appears like a conventional key and, as a matter of fact, can be used as such a conventional key for locking and unlocking a vehicle door and opening a fuel tank lid and a car trunk.

A control unit 3 provided on the vehicle 1 is connected to a light receiving unit 10 which is provided adjacent to the door handle of the vehicle door and consists of a photodiode 33 (FIG. 2) which is adapted to receive the infrared signal from the light emitting diodes 6a and 6b as described hereinafter. The control unit 3 is also connected to another light receiving unit 15 which is disposed adjacent to an ignition key switch 9 and consists of a photodiode 35 (FIG. 2) which is adapted to receive the infrared signal from the light emitting diodes 6a and 6b as described hereinafter.

An output of the control unit 3 is connected to a door lock drive unit 14 having an actuator for driving a door lock 13, either to lock or unlock it, which cooperates with a manual door lock lever 12. Another output of the control unit 3 is connected to an engine ignition system 16. The control unit 3 may be wired, as desired, to other equipment of the motor vehicle, such as a radio, a car stereo, a fuel injection system and other equipment, which is desired to be protected by this anti-theft system.

As generally shown in FIGS. 2 and 3, the control unit 3 is provided with a pair of contacts 11a and 11b which are adapted to electrically contact the contacts 8a and 8b of the key device 2 when the key shank 2a is fitted into the key hole of the ignition key switch 9 to supply electric power from a car battery 32 to a small rechargeable battery 23, such as a lithium battery or a silver oxide battery, provided in the key device 2.

FIG. 2 shows the general circuitry of the key device 2 and the control unit 3.

The transmitter 5 in the key device 2 is internally equipped with a CPU 21. A port 21a of the CPU 21 is connected to a ROM 22 serving as a fixed memory device. The CPU 21 and the ROM 22 are connected to the rechargeable battery 23. The other end of the battery 23 is grounded. A port 21b of the CPU 21 is connected to the base of a transistor T1 by way of a resistor R1 and is grounded by way of a resistor R2 of a relatively large resistive value. The emitter of this transistor T1 is grounded while the collector of this transistor T1 is connected to the light emitting diodes 6a and 6b, which are connected in series, by way of a resistor R3. The other end of the light emitting diodes 6a and 6b is connected to the battery 23. The transistor T1 thus forms an LED (light emitting diode) drive unit.

A port 21c of the CPU 21 is grounded by way of a resistor R4 and is connected to an end of a capacitor C1. The other end of the capacitor C1 is connected to an end of a diode bridge D1 to D4 (anodes of the diodes D1 and D3) and an end of the switch 7. The other end of the switch 7 is connected to the battery 23. The cathodes of the diodes D2 and D4 are grounded. The cathode of the diode D1 and the anode of the diode D2 are connected to the contact 8a while the cathode of the diode D3 and the anode of the diode D4 are connected to the contact 8b. Further, a diode D5 is connected across the switch 7.

The control unit 3 is also provided with a CPU 31 which is powered by the battery 32 mounted on the vehicle 1. The anode of the photodiode 33 which is provided adjacent to the vehicle door lock device is connected to the battery 32 while the cathode thereof is connected to a port 31a of the CPU 31 by way of an amplifier 34, which is likewise powered by the battery 32, in such a manner that the light signal from the light emitting diodes 6a and 6b is transmitted to the CPU 31 by way of the photodiode 33 and the amplifier 34. In a similar manner, the anode of a photodiode 35 which is provided adjacent to the ignition key switch 9 is connected to the battery 32 while the cathode thereof is connected to a port 31b of the CPU 31 by way of an amplifier 36 in such a manner that the light signal from the light emitting diodes 6a and 6b is transmitted to the CPU 31 by way of the photodiode 35 and the amplifier 36 which is likewise powered by the battery 32.

While the contact 11b of the control unit 3 is grounded, the other contact 11a is connected to the collector of a transistor T2. The emitter of this transistor T2 is connected to the battery 32 by way of a voltage regulator 37 having a current limiter while the base of the transistor T2 is controlled by a switching unit 38 which is connected to a port 31c of the CPU 31. A port 31d is connected to a ROM 39 which determines an internal code which the CPU 31 refers to in performing a code matching. A port 31e is an output port for controlling the door lock device 13 by way of the drive unit 14 and a port 31f is another output port for controlling the ignition system 16. A port 31g is connected to a limit switch 9a which detects the key shank 2a fitted into the key hole of the ignition key switch 9 as best shown in FIG. 3.

Although it is not specifically illustrated in FIG. 2, various control lines from the CPU 31 may be connected to various on-board devices, such as a radio, a car stereo and so forth, to selectively enable and disable them so that these devices can function only when enabled by the control unit 3 but cannot function when they are taken out of the system.

Now the action of the vehicular anti-theft device of the present invention is described in the following.

When the switch 7 of the key device 2 is pressed to lock or unlock a door lock by aiming the light emitting diodes 6a and 6b to the photodiode 33 provided adjacent to the door lock key hole, electric current is supplied to the port 21c of the CPU 21 by way of the capacitor C1 and this causes the port 21b to produce a train of code pulses. The code of this signal is determined by the contents of the ROM 22. As a result, the transistor T1 is turned on and off according to the level of the pulses and the light emitting diodes 6a and 6b emit a code light signal.

This code light signal is received by the photodiode 33 and, after being amplified by the amplifier 34, is determined by the CPU 31 if it matches the internal code stored in the ROM 39 or not. If the codes match up, a command to lock or unlock the door lock is transmitted from the CPU 31 to the door lock drive unit 14. The door lock drive unit 14 in turn drives an actuator which drives the manual lock lever 12 of each door. Thus, only the matching of the light signal code with the internal code takes place when the infrared light signal from the key device 5 is used to lock or unlock the door lock device. Generating a large number of different codes can be easily accomplished by "burning" different binary data into the ROMs 22 and 39. Thus, the production of anti-theft system with a large number of different codes and authorized duplication of the key device 2 are both easy.

When the key shank 2a of the key device 2 is fitted into the key hole of the ignition key switch 9, the contacts 8a and 8b of the key device 2 contact the corresponding contacts 11a and 11b of the control unit 3 and the limit switch 9a closes. As a result, a signal is produced from the port 31c of the CPU 31 and acts upon the base of the transistor T2 by way of the switching circuit 38. Then, electric current from the battery 32 is conducted through the voltage regulator 37, the transistor T2 and the contact 11a, the diodes D1 and D5 and charges the battery 23 of the key device 2. At the same time, electric current is supplied to the port 21c of the CPU 21 of the key device 2 by way of the capacitor C1 and the light emitting diodes 6a and 6b emit the code light signal in the same way as when the push-button switch 7 is pressed.

When this code light signal is supplied to the CPU 31 by way of the photodiode 35 and the amplifier 36, the CPU 31 determines if the code of the light signal matches an internal code or not. Alternatively, it is possible to use different codes for the door lock system and the engine ignition system by slightly modifying the circuitry. In any case, when the codes match up, the radio, the car stereo, the ignition system, the fuel injection system and other on-board devices which are to be protected by the anti-theft system are enabled.

Typically, the ignition key of a motor vehicle has a planar key shank and can be fitted into a key hole at two different orientations which are angularly displaced by 180 degrees. The diode bridge D1 to D4 provided in the key device 2 assures a correct polarity of the electric current that is supplied to the battery 23. When the contacts between the two sets of contacts 8 and 11 are reversed, the electric current from the positive end of the battery 32 is conducted through the diode D3, instead of the diode D1, and is supplied to the positive end of the battery 23 as required. The functions of the diodes D2 and D4 are likewise reversed.

Since a pair of light emitting diodes 6a and 6b are provided at diagonally opposed positions of the key device 2 while there is only one photodiode 35, transmission of the code light signal from either the light-emitting diode 6a or 6b can reach the corresponding photodiode 35. If a light guiding ring 17 is provided around the key hole of the ignition key switch 9 as shown in FIG. 3, the light from the light emitting diodes 6a and 6b can reach the photodiode 35 irrespective of the angular position of the key shank 9 relative to the ignition key switch 9. In this case, even when one of the light emitting diodes 6a and 6b is eliminated, the transmission of a light signal from the transmitter 5 and the photodiode 35 is possible. Alternatively, a pair of light receiving elements may be provided adjacent to the open end of the key hole at positions which are angularly displaced by 180 degrees about a longitudinal axial line of the key hole. In this case, even when only one light emitting diode is provided in the key device, the key shank may be fitted into the key hole at two different orientations. Actually, one can arrange a desired number of light receiving elements or light emitting elements around the longitudinal axial line of the key hole or the key shank as the case may be.

In the above described embodiment, the electric charging of the battery 23 and the emission of the code light signal from the light emitting diodes 6a and 6b took place when the key shank 2a is fitted into the key hole and it is detected by the limit switch 9a. However, it is also possible to have the electric charging of the battery 23 and/or the emission of the code light signal from the light emitting diodes take place when the key shank 2 is turned over a certain angle in the key hole or, alternatively, the emission of the code light signal from the light emitting diodes may be caused solely by pressing the push-button switch 7.

FIGS. 4 and 5 show an alternate embodiment of the contact structure provided between the key device 2 and the control unit 1. The contacts 19a and 19b of the control unit 3 are connected to the internal circuit of the control unit 3 in a similar manner as the contacts 11a and 11b of the control unit 3 of the previous embodiment but in the present embodiment the key device 2 is provided with three contacts 18a, 18b and 18c as shown in FIG. 4. One of the contacts 19b of the control unit 3 which is grounded in the control unit 3 is adapted to engage a major surface of the metallic key shank 2a while the contact 19a is similar to the contacts 11a and 11b and is adapted to contact a narrow side face of the base end of the key shank 2a when it is fully fitted into the key hole as shown in FIG. 5. As for the key device 2, the middle contact 18b consists of the metallic key shank 2a itself which is grounded by way of a diode D7 while the other two contacts 18a and 18b are arranged on either narrow side of the base end of the key shank 2a and are commonly connected to the positive end of the battery 23 by way of a diode D6. The diodes D6 and D7 prevent inadvertent short circuiting of the battery 23. Alternatively, a contact insulated from the key shank 2a itself may be provided in one of the major surfaces of the key shank 2a.

Thus, according to the present embodiment, although no polarity rectifying circuit such as the diode bridge D1 to D4 of the previous embodiment is provided, electric current of correct polarity will be supplied from the battery 32 to the rechargeable battery 23 irrespective of the orientation of the key shank 2a fitted into the key hole.

Although the present invention has been shown and described with reference to the preferred embodiments thereof, it should not be considered as limited thereby. Various possible modifications and alterations could be conceived of by one skilled in the art to any particular embodiment, without departing from the scope of the invention.

What we claim is:
1. A vehicular anti-theft system, comprising
a key device having a shank and a casing, said casing connected to a base end of the shank and adapted to be held between fingers of a user, the casing of the key device being provided with a light emitting element which emits a code light signal;
a key hole provided on a vehicle to receive the shank of the key device therein from an open end of the key hole;
a light receiving element provided adjacent to the open end of the key hole to receive the code light signal from the light emitting element when the shank of the key device is fitted into the key hole; and
control means connected to the light receiving element for receiving a code signal from the light emitting element; the control means being provided with light code matching means which enables a device mounted on the vehicle when the code signal from the light receiving element matches with an internal code; wherein only one light emitting element is provided on the housing of the key device and only one light receiving element is provided adjacent to the open end of the key hole, a light conducting ring being provided around the open end of the key hole to conduct the code light signal from the light emitting element to the light receiving element irrespective of the orientation of the shank of the key device relative to the key hole.

2. A vehicular anti-theft system as defined in claim 1, wherein the casing is provided with a manual switch which causes emission of the code light signal from the light emitting element.

3. A vehicular anti-theft system as defined in claim 1, wherein the key hole is provided with means for detecting the shank of the key device being fitted therein and the light code matching means is activated when the detecting means has detected the shank of the key device in the key hole.

4. A vehicular anti-theft system as defined in claim 1, wherein the key hole is provided with means for detecting rotation of the shank of the key device therein and the code matching means is activated when the detecting means has detected the rotation of the shank of the key device in the key hole.

5. A vehicular anti-theft system as defined in claim 1, wherein the shank of the key device and the key hole are provided with electric contacts, respectively, which (make electrical contact with one another) for supplying electric power from a power source of the vehicle to the light emitting element of the key device when the shank is fitted into the key hole.

6. A vehicular anti-theft system as defined in claim 5, wherein the key hole is provided with means for detecting the shank of the key device being fitted therein and the electric power from the power source of the vehicle is supplied to the light emitting element when the said means has detected the key shank of the key device in the key hole.

7. A vehicular anti-theft system as defined in claim 5, wherein the key hole is provided with means for detecting rotation of the shank of the key device therein and the electric power from the power source of the vehicle is supplied to the light emitting element when the said means has detected the rotation of the shank of the key device in the key hole.

8. A vehicular anti-theft system as defined in claim 5, wherein the electric power is conducted from the vehicle power source to the light emitting element by way of a rechargeable battery incorporated in the casing of the key device.

9. A vehicular anti-theft system as defined in claim 5, wherein the shank of the key device consists of a generally planar member having a pair of narrow side faces and a pair of broad side faces, at least a pair of the electric contacts being arranged on these side faces, the electric contacts of the key device being connected to the light emitting element by way of a polarity rectifying means; and the key hole is so shaped as to be generally complementary to the shank and is provided with two sets of the electric contacts at positions around the open end of the key hole which oppose one another by a 180 degree angle in such a manner that the shank of the key device may be fitted into the key hole at two different orientations.

10. A vehicular anti-theft system as defined in claim 9, wherein a pair of light emitting elements are provided in the housing of the key device adjacent to the base end of the shank and angularly displaced by 180 degrees about a longitudinal axial line of the shank of the key device.

11. A vehicular anti-theft system as defined in claim 9, wherein a pair of light receiving elements are provided adjacent to the open end of the key hole at positions which are angularly displaced by 180 degrees about a longitudinal axial line of the key hole.

12. A vehicular anti-theft system as defined in claim 1, wherein the shank of the key device and the key hole are provided with mechanical code matching means which match with one another and the device mounted on the vehicle is enabled when code matching of both the light code matching means and the mechanical code matching means is detected.

13. A vehicular anti-theft system as defined in claim 12, wherein the device to be enabled comprises an engine ignition system and a vehicle door lock device, and code matching of both the mechanical code matching means and the light code matching means is required to enable the engine ignition system but code matching of either the mechanical code matching means or the light code matching means is required to enable the door lock device, the light emitting element being provided with manual switch means for activating the same at least for enabling the door lock device.

14. A vehicular anti-theft system as defined in claim 1, wherein the device to be enabled comprises an engine ignition system and a vehicle door lock device.

15. A vehicular anti-theft system, comprising:
a key device having a shank and a casing, said casing connected to a base end of the shank and adapted to be held between fingers of a user, the casing of the key device being provided with a light emitting element which emits a code light signal and a manual switch for causing the emission of the code light signal from the light emitting element;
a key hole provided on a vehicle to receive the shank of the key device therein from an open end of the key hole;
a light receiving element provided adjacent to the open end of the key hole to receive the code light signal from the light emitting element; and
control means connected to the light receiving element for receiving a code signal from the light emitting element; the control means being provided with light code matching means which enables a device mounted on the vehicle when the code signal from the light receiving element matches with an internal code; wherein only one light emitting element is provided on the housing of the key device and only one light receiving element is provided adjacent to the open end of the key hole, a light conducting ring being provided around the open end of the key hole to conduct the code light signal from the light emitting element irrespective of the orientation of the shank of the key device relative to the key hole.

16. A vehicular anti-theft system as defined in claim 15, wherein the shank of the key device and the key hole are provided with electric contacts, respectively, which make electrical contact with one another for supplying electric power from a power source of the vehicle to the light emitting element of the key device when the shank is fitted into the key hole.

17. A vehicular anti-theft system, comprising:
a key device having a shank and a casing, said casing connected to a base end of said shank and adapted to be held between the fingers of a user, the casing of the key device being provided with a light emitting element which emits a code light signal for activating an on-board device, and a rechargeable battery for supplying electric power to said light emitting element;
a key hole provided on a vehicle to receive the shank of said key device therein from an open end of said key hole;
electric contact means provided in the shank of said key device and said key hole for mutual contact when said key shank is fitted into said key hole; and
the electric contact means of said key hole being connected to a power source of the vehicle while the electric contact means of said key shank is connected to said rechargeable battery.

18. A vehicular anti-theft system as defined in claim 17, wherein said on-board device is a door lock device.

19. A vehicular anti-theft system as defined in claim 17, wherein the casing is provided with a manual switch which causes emission of the code light signal from the light emitting element.

20. A vehicular anti-theft system as defined in claim 17, wherein the key hole is provided with means for detecting the shank of the key device being fitted therein and the code matching means is activated when the detecting means has detected the shank of the key device in the key hole.

21. A vehicular anti-theft system as defined in claim 17, wherein the key hold is provided with means for detecting rotation of the shank of the key device therein and the code matching means is activated when the detecting means has detected a rotation of the shank of the key device in the key hole.

22. A vehicular anti-theft system, comprising:
a key device having a shank and a casing which is connected to a base end of the shank and is adapted to be held between the fingers of a user, the casing of the key device being provided with a light emitting element which is adapted to emit a code light signal;
a key hole provided on a vehicle adapted to receive the shank of the key device therein from an open end of the key hole;
a light receiving element provided adjacent to the open end of the key hole so as to receive the code light signal from the light-emitting element when the shank of the key device is fitted into the key hole; and
control means connected to the light receiving element for receiving a code signal from the light emitting element, the control means being provided with light code matching means which enables a device mounted on the vehicle when the code signal from the light receiving element matches with an internal code;
wherein the shank of the key device and the key hole are provided with mechanical code matching means which match with one another and the device mounted on the vehicle is enabled when code matching of both the light code matching means and the mechanical code matching means is detected; and
wherein the device to be enabled comprises a piece of equipment of the vehicle and a vehicle door lock device, and code matching of both the mechanical code matching means and the light code matching means is required to enable the piece of equipment of the vehicle but code matching of either the mechanical code matching means or the light code matching means is required to enable the door lock device, the light emitting element being provided with manual switch means for activating the same at least for enabling the door lock device.

23. A vehicular anti-theft system as defined in claim 22, wherein the casing is provided with a manual switch which causes emission of the code light signal from the light emitting element.

24. A vehicular anti-theft system as defined in claim 22, wherein the key hole is provided with means for detecting the shank of the key device being fitted therein and the code matching means is activated when the detecting means has detected the shank of the key device in the key hole.

25. A vehicular anti-theft system as defined in claim 22, wherein the key hole is provided with means for detecting rotation of the shank of the key device therein and the code matching means is activated when the detecting means has detected the rotation of the shank of the key device in the key hole.

26. A vehicular anti-theft system as defined in claim 22, wherein the shank of the key device and the key hole are provided with electric contacts, respectively, which cooperate one another for supplying electric power from a power source of the vehicle to the light emitting element of the key device when the shank is fitted into the key hole.

27. The vehicular anti-theft system as defined in claim 26, wherein the key hole is provided with means for detecting the shank of the key device being fitted therein and the electric power from the power source of the vehicle is supplied to the light emitting element when said means has detected the key shank of the key device in the key hole.

28. A vehicular anti-theft system as defined in claim 26, wherein the key hole is provided with means for detecting rotation of the shank of the key device therein and the electric power from the power source of the vehicle is supplied to the light emitting element when said means has detected the rotation of the shank of the key device in the key hole.

29. A vehicular anti-theft system as defined in claim 26, wherein the electric power is conducted from the vehicle power source to the light emitting element by way of a rechargeable battery incorporated in the casing of the key device.

* * * * *